United States Patent [19]

Trotter et al.

[11] Patent Number: 5,013,820

[45] Date of Patent: May 7, 1991

[54] PREPARATION OF POLY(ETHLENE-2,6-NAPHTHALENE DICARBOXYLATE) FROM DIMETHYL-2,6-NAPHTHALENE DICARBOXYLATE AND METHYL HYDROGEN 2,6-NAPHTHALENE DICARBOXYLATE

[75] Inventors: Jimmy R. Trotter; Bobby J. Sublett, both of Kingsport, Tenn.

[73] Assignee: Eastman Kodak Company, Rochester, N.Y.

[21] Appl. No.: 337,231

[22] Filed: Apr. 12, 1989

[51] Int. Cl.$^5$ ............................................. C08G 63/20
[52] U.S. Cl. ..................................... 528/272; 528/298; 528/308; 528/481; 528/491
[58] Field of Search ............... 528/272, 298, 308, 481, 528/491

[56] References Cited

U.S. PATENT DOCUMENTS

| 4,117,250 | 9/1978 | Foster et al. | 568/858 |
| 4,521,585 | 6/1985 | Thomsen et al. | 528/271 |
| 4,594,406 | 6/1986 | Thomsen et al. | 528/271 |

FOREIGN PATENT DOCUMENTS 2193842  2/1974  France .

OTHER PUBLICATIONS

Chemical Abstracts, vol. 81, No. 24, Dec. 16, 1974, (Columbus, Ohio, U.S.), see p. 56, Abstract 153503p, & JP, A, 7343192 (Teijin LTD) Dec. 17, 1973.

Primary Examiner—John Kight, III
Assistant Examiner—Sam A. Acquah
Attorney, Agent, or Firm—John F. Stevens; William P. Heath, Jr.

[57] ABSTRACT

This invention relates to a method of preparing poly(ethylene 2,6-naphthalene dicarboxylate) by the polycondensation reaction of ethylene glycol and dimethyl-2,6-naphthalene dicarboxylate, using a dimethyl-2,6-naphthalene dicarboxylate starting material which contains significant amounts of methyl hydrogen 2,6-naphthalene dicarboxylate as a contaminant. The methyl hydrogen 2,6-naphthalene dicarboxylate moiety is incorporated into the polymer structure by initially esterifying the methyl hydrogen 2,6-naphthalene dicarboxylate acid end-group with ethylene carbonate, in the presence of an amine or ammonium catalyst, before the polyesterification/polycondensation reaction is performed.

8 Claims, No Drawings

PREPARATION OF POLY(ETHLENE-2,6-NAPHTHALENE DICARBOXYLATE) FROM DIMETHYL-2,6-NAPHTHALENE DICARBOXYLATE AND METHYL HYDROGEN 2,6-NAPHTHALENE DICARBOXYLATE

BACKGROUND OF THE INVENTION

1. Field of the Invention

The present invention relates to the production of poly(ethylene-2,6-naphthalene dicarboxylates).

2. Discussion of the Background

Poly(ethylene-2,6-naphthalene dicarboxylates) are produced by the polyesterification of dimethyl-2,6-naphthalene dicarboxylate and ethylene glycol in the presence of polycondensation and polyesterification catalyst systems.

In the preparation of dimethyl-2,6-naphthalene dicarboxylate, significant amounts of methyl hydrogen 2,6-naphthalene dicarboxylate are also produced. Consequently, during a typical preparation of poly(ethylene-2,6-naphthalene dicarboxylate) from dimethyl-2,6-naphthalene dicarboxylate, the presence of methyl hydrogen 2,6-naphthalene dicarboxylate inhibits the polycondensation reaction. This inhibition produces a final product that has a lower than desirable inherent viscosity.

There is thus a need for producing a high quality poly(ethylene-2,6-naphthalene dicarboxylate) product from a dimethyl-2,6-naphthalene dicarboxylate starting material contaminated with methyl hydrogen 2,6-naphthalene dicarboxylate.

SUMMARY OF THE INVENTION

Accordingly, it is an object of this invention to provide a process for preparing a high quality poly(ethylene-2,6-naphthalene dicarboxylate) product from a dimethyl-2,6-naphthalene dicarboxylate starting material contaminated with methyl hydrogen 2,6-naphthalene dicarboxylate.

The inventors have now discovered a process which satisfies this object of this invention and other objects which will become apparent from the description of the invention given hereinbelow. In this process, a dimethyl-2,6-naphthalene dicarboxylate product which contains up to 10 wt % of methyl hydrogen 2,6-naphthalene dicarboxylate is first esterified with ethylene carbonate in the presence of an amine or ammonium catalyst. This esterified material is then reacted with ethylene glycol in the presence of a polyesterification/polycondensation catalyst system to obtain a high quality poly(ethylene-2,6-naphthalene dicarboxylate) product. It should be realized that glycols other than ethylene glycol may also be present, for example, glycols having 3-8 carbon atoms.

DETAILED DESCRIPTION OF THE PREFERRED EMBODIMENTS

The inventors have found that the methyl hydrogen 2,6-naphthalene dicarboxylate moiety in the dimethyl-2,6-naphthalene dicarboxylate can be incorporated into the polymer chain by initially esterifying the methyl hydrogen 2,6-naphthalene dicarboxylate acid end-group with ethylene carbonate in the presence of an amine or ammonium catalyst. After the methyl hydrogen 2,6-naphthalene dicarboxylate moiety is fully esterified, poly(ethylene-2,6-naphthalene dicarboxylate) can be readily prepared from the reaction mixture using normal polyesterification/polycondensation reaction conditions. The resulting poly(ethylene-2,6-naphthalene dicarboxylate) has good properties and color. It can be used in packaging, film, and fiber applications.

Methyl hydrogen 2,6-naphthalene dicarboxylate can be removed from the dimethyl-2,6-naphthalene dicarboxylate by several purification processes such as repeated crystallization or distillation. Both of these processes are expensive.

It is obvious that the process for manufacturing poly(ethylene-2,6-naphthalene dicarboxylate) should be as inexpensive as possible. The present invention makes possible the low cost production of a high quality poly(ethylene-2,6-naphthalene dicarboxylate) from dimethyl-2,6-naphthalene dicarboxylate containing methyl hydrogen 2,6-naphthalene dicarboxylate.

If the methyl hydrogen 2,6-naphthalene dicarboxylate acid end-group is not sufficiently esterified with the ethylene carbonate, the unreacted methyl hydrogen 2,6-naphthalene dicarboxylate moiety inhibits the polycondensation reaction. Inhibition results in a final product that has a lower than desirable inherent viscosity. The methyl hydrogen 2,6-naphthalene dicarboxylate present in the starting mixture must therefore be esterified to at least 98% with a 10 wt % presence of this contaminant. Corresponding lower amounts of esterification may be used with lower contents of the contaminant in the starting mixture.

U.S. Pat. No. 4,521,585 discloses that poly(ethylene terephthalate), poly(ethylene 1,4-cyclohexanedicarboxylate), poly(ethylene isophthalate), poly(ethylene naphthalate), their copolymers with each other and with modifying aliphatic dicarboxylic acids, and substituted glycol repeat unit modifications thereof may be produced from a prepolymer (oligomer). The prepolymer is obtained from the esterification of the corresponding acid or acids with ethylene carbonate or substituted ethylenecarbonate in the presence of one or more amine compounds.

The amine compounds used include trialkylamines, tetraalkyldiamines, N-alkylated heterocyclic amines, and certain quaternary ammonium salts. There is no suggestion in this document however that ethylene carbonate may be used in accordance with the present invention to permit the incorporation of methyl hydrogen 2,6-naphthalene dicarboxylate into a high quality poly(ethylene-2,6-naphthalene dicarboxylate) product obtained from the polyesterification of dimethyl-2,6-naphthalene dicarboxylate.

The present invention thus relates to the preparation of poly(ethylene-2,6-naphthalene dicarboxylate) by the polycondensation reaction of ethylene glycol and a dimethyl-2,6-naphthalene dicarboxylate product which contains significant amounts of methyl hydrogen 2,6-naphthalene dicarboxylate as a contaminant. The present invention makes possible incorporating the methyl hydrogen 2,6-naphthalene dicarboxylate moiety in the dimethyl-2,6-naphthalene dicarboxylate into the polymer chain by initially esterifying the methyl hydrogen 2,6-naphthalene dicarboxylate acid end-group with ethylene carbonate in the presence of an amine or ammonium catalyst.

After the methyl hydrogen 2,6-naphthalene dicarboxylate moiety is fully esterified, a polyesterification/polycondensation catalyst system is added to the reaction mixture and the polyesterification and polycondensation reactions are carried out. For example, at the polycondensation stage, the reaction mixture may be polycondensed in the melt, e.g., at 270° C. to 300° C., for example at about 285° C. to an inherent viscosity (I.V.) of 0.5 to 0.6.

The resulting poly(ethylene-2,6-naphthalene dicarboxylate) has good color and low diethylene glycol content. The low diethylene glycol level is particularly advantageous since other methods of esterifying the methyl hydrogen 2,6-naphthalene dicarboxylate acid end-group generate significant amounts of diethylene glycol.

The dimethyl-2,6-naphthalene dicarboxylate starting material used in the process of the present invention contains up to 10 wt % of methyl hydrogen 2,6-naphthalene dicarboxylate. The present process may be used to advantage with starting materials having contamination levels of methyl hydrogen 2,6-naphthalene dicarboxylate of any level which provide an undesirable effect on the properties of the poly(ethylene-2,6-naphthalene dicarboxylate) product obtained, i.e. down to 0.5 wt %.

In the first stage of the process in which the methyl hydrogen 2,6-naphthalene dicarboxylate-containing dimethyl-2,6-naphthalene starting material is esterified with ethylene carbonate, the ethylene carbonate is used in a molar ratio, relative to the amount of methyl hydrogen 2,6-naphthalene dicarboxylate present, of from 2:1 to 5:1. This esterification reaction is run in the presence of an amine or an ammonium catalyst. The ethylene carbonate used may be obtained from ethylene oxide and $CO_2$ as described in U.S. Pat. No. 4,117,250.

The amine or ammonium catalysts which may be used include one or more of trialkylamines, preferably triethylamine, tripropylamine and tributylamine, tetraalkyl nitrogen substituted diamines, N,N'-dialkyl piperazine, N-alkyl piperidine, and certain quaternary ammonium salts defined below.

The trialkylamines useful herein have the formula $R_3N$ wherein the R alkyl groups are all the same or mixed and are linear or branched and contain up to about 18 carbons. Preferred are those wherein each R is selected from ethyl, propyl and butyl. It is desirable, in most cases, to employ trialkylamines having boiling points below the desired polycondensation temperature, i.e., below about 280° C. to 285° C. in order to recover said amines for recycle.

The tetraalkyl nitrogen substituted diamines have the formula $R^2R^3N-R^1-NR^4R^5$ wherein $R^1$ is straight or branched alkylene of 1-8 carbons, and each of $R^2$, $R^3$, $R^4$ and $R^5$ is independently selected from straight or branched alkyl of 1-8 carbons. The alkyl moieties $R^2$ and $R^3$ of the N,N'-dialkyl piperazine

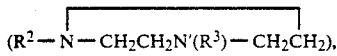

and the N-alkyl piperidine

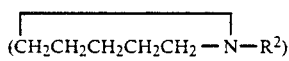

are as defined above.

The quaternary ammonium salts (the term "salts", herein includes counterpart bases) useful herein have the general formula $(R^6)_4N^+X^-$, wherein each $R^6$ group is independently selected from linear or branched alkyl of 1–18 carbons, and one of which may be benzyl, and wherein the counterion $X^-$ may be hydroxide or a carboxylate anion from a carboxylic acid such as acetic, propionic, benzoic, and the like. It is preferred that each $R^6$ group not exceed 8 carbons, and it is particularly preferred that three of the R6 groups are methyl and the other is a higher alkyl not exceeding 8 carbons, most preferably ethyl or butyl. Also particularly preferred is that each $R^6$ is ethyl or butyl, and also that three R6 groups are ethyl and the remaining $R^6$ is benzyl.

A preferred group of specific amine or ammonium components comprises triethylamine, tri-n-propylamine, tri-n-butylamine, ethyltrimethylammonium hydroxide, tetraethylammonium hydroxide, benzyltriethylammonium hydroxide, propyltrimethylammonium hydroxide, butyltrimethylammonium hydroxide, tetraethylammonium bromide, tetraethylammonium acetate, tetrabutylammonium hydroxide, and benzyltriethylammonium hydroxide.

In the esterification reaction, the preferred range for the trialkylamine and N-alkyl piperidine is 0.5 to 5.0 mol %, preferably 2.5 mol %, for the ammonium salt is 0.25 to 1.0 mol %, and for the tetraalkyldiamines and dialkyl piperazines is 0.25 to 1.25 mol %. All of these ranges are based on the amount of ethylene carbonate present.

The esterification reaction is carried out at a temperature of 160° C. to 220° C., preferably 175° C. to 205° C. for 1 to 5 hours, typically.

The esterification of the methyl hydrogen 2,6-naphthalene dicarboxylate-contaminated dimethyl-2,6naphthalene dicarboxylate starting material proceeds with the evolution of carbon dioxide. The first stage of the reaction may thus be monitored by the evolution of carbon dioxide, with the cessation of this evolution of carbon dioxide indicating the end of the esterification reaction.

Once the methyl hydrogen 2,6-naphthalene dicarboxylate-contaminated dimethyl-2,6-naphthalene dicarboxylate starting material has been esterified to a level of at least 98 mol % as noted supra, the reaction mixture is then reacted with ethylene glycol in the presence of a polyesterification/polycondensation catalyst. The catalyst used maybe any polyesterification/polycondensation catalyst typically used in this reaction. The catalyst may be used in concentrations typically used in polyesterification/polycondensation reactions.

For example, the polyesterification/polycondensation reaction catalyst may be a catalyst having the following components Mn, Sb and Co which are added to the reaction mixture as manganese acetate, antimony oxide (or antimony acetate) and cobalt acetate. Other catalysts which may be used include titanium alkoxides (e.g. titanium isopropoxide), germanium oxide, tin acetate, or zinc acetate. Typical reaction temperatures for the polyesterification and polycondensation reactions are used.

In accordance with standard polyesterification reactions, the reaction may also be first run at a temperature of from 150° C. to 275° C., preferably 200° C. to 215° C. for 1 hr to 5 hr.

The polycondensation reaction to build the I.V. to the desired level is carried out by any of a wide variety of known processes such as at temperatures of from about 180° C. to about 290° C., but usually preferably from about 240° C. to about 285° C., under a vacuum in the melt, or by solid state in a fixed-bed reactor as in U.S. Pat. No. 4,161,578 incorporated herein by reference, at a temperature of from about 200° C. to below the sticking point of the polymer and in the presence of a suitable catalyst, e.g., titanium (as the tetraisopropoxide) or antimony (as the triacetate) as a slurry in ethylene glycol, in a concentration, for example, from about 50 to about 400 ppm of Sb or 10–200 pm of Ti based on the theoretical final polymer weight.

The terms "sticking point" as used herein denotes temperatures which range from where the polymer particles just begin to tend to stick to each other to where sufficient sticking and agglomeration of the particles occurs to seriously inhibit the necessary flow of polymer from the solid-stating reactor. The term "below" therefore, actually can encompass temperatures at which some sticking and agglomeration occurs, but which are still at an operable level.

In the esterification reaction, it is not necessary for the reaction mixture to become clear prior to raising the temperature required for polycondensation, particularly if the mole ratio of carbonate to diacid is <2. It is, however, desirable in all cases for the melt to become clear for several minutes prior to beginning the polycondensation in order to achieve greater clarity in the final polymer.

Other features of the invention will become apparent in the course of the following descriptions of exemplary embodiments which are given for illustration of the invention and are not intended to be limiting thereof.

EXAMPLES

The following examples describe a process for producing poly(ethylene-2,6-naphthalene dicarboxylate) from dimethyl-2,6-naphthalene dicarboxylate containing up to 10 wt % methyl hydrogen 2,6-naphthalene dicarboxylate via the use of ethylene carbonate.

Comparative Example 1

About 125.64 grams of dimethyl-2,6-naphthalene dicarboxylate which contains 2.9% of methyl hydrogen 2,6-naphthalene dicarboxylate (3.64 grams; 0.0158 mol), 62 grams (1 mol) of ethylene glycol, and the polycondensation catalyst (55 ppm Mn, 200 ppm Sb, and 55 ppm Co)[1] are weighed into a 500 ml round-bottom flask equipped with a nitrogen inlet, a stirrer, a vacuum outlet, and a condensing flask. The reaction flask is heated at 200° C. with stirring under a nitrogen atmosphere in a Belmont metal bath for 3 hours. After 3 hours at 200° C., no apparent ester exchange reaction had taken place (no methanol evolution).

This example demonstrates that a poly(ethylene-2,6-naphthalene dicarboxylate) polymer cannot be prepared using dimethyl-2,6-naphthalene dicarboxylate that is contaminated with methyl hydrogen 2,6-naphthalene dicarboxylate when using a conventional catalyst system.

Comparative Example 2

About 125.64 grams of dimethyl-2,6-naphthalene dicarboxylate which contains 2.9% of methyl hydrogen 2,6-naphthalene dicarboxylate (3.64 grams; 0.0158 mol), 62 grams (1 mol) of ethylene glycol, 1.39 grams (0.0158 mol) of ethylene carbonate, and 0.00798 gram (0.000079 mol) of triethylamine (0.5 mol % based on ethylene carbonate) are weighed into a 500 ml roundbottom flask equipped with a nitrogen inlet, a stirrer, a vacuum outlet, and a condensing flask. The reaction flask is heated at 200° C. with stirring in a Belmont metal bath for 3 hours until carbon dioxide evolution has creased (0.013 cu ft, as measured with a wet test meter). The reaction flask is then removed from the Belmont metal bath and allowed to cool for 15 minutes. After cooling the polyesterification catalyst (55 ppm Mn, 200 ppm Sb, and 55 ppm Co) is added to the reaction mixture. The flask is reinserted into the metal bath and is heated at 200° C. with stirring under a nitrogen atmosphere. After 35 minutes at 200° C., no apparent ester exchange reaction had taken place (no methanol evolution). Also no ester exchange apparently took place after an additional 55 ppm Mn catalyst was added to the reaction.

This example shows that an ethylene carbonate/methyl hydrogen 2,6-naphthalene dicarboxylate ratio of 1/1 is not sufficient for complete reaction.

Example 1

About 122 grams (0.5 mol) of dimethyl-2,6-naphthalene dicarboxylate, 3.81 grams of methyl hydrogen 2,6-naphthalene dicarboxylate (95.7% pure, 3.64 grams; 0.0158 mol), 62 grams (1 mol) of ethylene glycol, 2.78 grams (0.0316 mols) of ethylene carbonate, and 2.5 mol % of triethylamine, based on ethylene carbonate, are weighed into a 500 ml round-bottom flask equipped with a nitrogen inlet, a stirrer, a vacuum outlet, and a condensing flask. The reaction flask is heated at 215° C. with stirring in a Belmont metal bath for 2 hours until carbon dioxide evolution has creased (0.037 cu ft, as measured with a wet test meter).

The reaction flask is then removed from the Belmont metal bath and allowed to cool. After cooling the polyesterification catalyst (55 ppm Mn, 200 ppm Sb, and 55 ppm Co) is added to the reaction mixture. The flask is reinserted into the metal bath and is heated at 200° C. to 215° C. for 2 hours and 45 minutes with stirring under a nitrogen atmosphere. Then 55 ppm of Zonyl A catalyst (available from du Pont de Nemours, Co.) is added to the reaction and the temperature is raised to 285° C. The reaction is heated at 285° C. under reduced pressure (0.1 mm pressure) for 55 minutes. The flask is removed from the metal bath and is allowed to cool under a nitrogen atmosphere until the polymer solidifies. The polymer has an I.V. of 0.439 in parachlorophenol/ tetrachloroethane/phenol (40:35:25 by weight) (PCLOL). GC. analysis indicates that the polymer contains 1.7 mol % diethylene glycol and 0.056 wt % methanol (used as a measure of the methyl end groups). The polymer has a carboxyl number of 18.59 eq/10**6 g.

Example 2

About 122 grams (0.5 mol) of dimethyl-2,6-naphthalene dicarboxylate, 3.81 grams of methyl hydrogen 2,6-naphthalene dicarboxylate (95.7% pure; 3.64 grams; 0.0158 mol), 62 grams (1 mol) of ethylene glycol, 4.87 grams (0.0553 mol) of ethylene carbonate, and 0.5 mol % of triethylamine, based on ethylene carbonate, are weighed into a 500 ml round-bottom flask equipped with a nitrogen inlet, a stirrer, a vacuum outlet, and a condensing flask. The reaction flask is heated at 200° C. with stirring in a Belmont metal bath for 2 hours until carbon dioxide evolution has creased (0.038 cu ft, as measured with a wet test meter).

The reaction flask is then removed from the Belmont metal bath and allowed to cool slightly. After cooling the polyesterification catalyst (55 ppm Mn, 200 ppm Sb, and 55 ppm Co) is added to the reaction mixture. The

---

[1] Added as Manganese acetate, antimony oxide or acetate, and cobalt acetate.

flask is reinserted into the metal bath and is heated at 200° C. to 215° C. for 3 hours with stirring under a nitrogen atmosphere. Then 55 ppm P catalyst is added to the reaction and the temperature is raised to 285° C. The reaction is heated at 285° C. under reduced pressure (0.2 mm pressure) for 68 minutes. The flask is removed from the metal bath and is allowed to cool under a nitrogen atmosphere until the polymer solidifies. The polymer has an I.V. of 0.520 in PCLOL. GC analysis indicates that the polymer contains 2.9 mol % diethylene glycol and 0.168 wt % methanol (used as a measure of the methyl end groups). The polymer has a carboxyl number of 13.20 eq/10**6

Example 3

About 122 grams (0.5 mol) of dimethyl-2,6-naphthalene dicarboxylate, 3.81 grams of methyl hydrogen 2,6-naphthalene dicarboxylate (95.7% pure; 3.64 grams; 0.0158 mol), 62 grams (1 mol) of ethylene glycol, 6.95 grams (0.079 mol) of ethylene carbonate, and 0.5 mol% of triethylamine, based on ethylene carbonate, are weighed into a 500 ml round-bottom flask equipped with a nitrogen inlet, a stirrer, a vacuum outlet, and a condensing flask. The reaction flask is heated at 200° C. with stirring in a Belmont metal bath for 1.3 hours until carbon dioxide evolution has creased (0.036 cu ft, as measured with a wet test meter).

The reaction flask is then removed from the Belmont metal bath and allowed to cool slightly. After cooling the polyesterification catalyst (55 ppm Mn, 200 ppm Sb, and 55 ppm Co) is added to the reaction mixture. The flask is reinserted into the metal bath and is heated at 200° C.–215° C. for 2 hours with stirring under a nitrogen atmosphere. Then 55 ppm P catalyst is added to the reaction and the temperature is raised to 285° C. The reaction is heated at 285° C. under reduced pressure (0.1 mm pressure) for 60 minutes. The flask is removed from the metal bath and is allowed to cool under a nitrogen atmosphere until the polymer solidifies. The polymer has an I.V. of 0.561 in PCLOL. GC analysis indicates that the polymer contains 3.7 mol % diethylene glycol and 0.074 wt % methanol (used as a measure of the methyl end groups). The polymer has a carboxyl number of 13.60 eg/10**6 g.

Examples 1, 2 and 3 demonstrate that reactions of 2/1, 3.5/1, and 5/1 ratios of ethylene carbonate/methyl hydrogen 2,6-naphthalene dicarboxylate are sufficient to give complete reaction of methyl hydrogen 2,6-naphthalene dicarboxylate and that after the methyl hydrogen 2,6-naphthalene dicarboxylate reaction is complete, poly(ethylene-2,6-naphthalene dicarboxylate) can be prepared from the material using conventional catalysts.

As used herein, the inherent viscosity (I.V.) is measured at 25° C. using 0.50 g of polymer per 100 ml of a solvent consisting of 60% by weight phenol and 40% by weight tetrachloroethane.

Obviously, numerous modifications and variations of the present invention are possible in light of the above teachings. It is therefore to be understood that within the scope of the appended claims, the invention may be practiced otherwise than as specifically described herein.

We claim:

1. A process for producing a poly(ethylene-2,6-naphthalene dicarboxylate) product from a mixture of dimethyl-2,6-naphthalene dicarboxylate and methyl hydrogen 2,6-naphthalene dicarboxylate, comprising:

a. esterifying a mixture containing at least 90 wt % of dimethyl-2,6-naphthalene dicarboxylate and not more than 10 wt % of methyl hydrogen 2,6-naphthalene dicarboxylate with ethylene carbonate in the presence of an amine or an ammonium catalyst to obtain an esterified mixture, wherein said ethylene carbonate is present in an amount of at least 2 molar equivalents relative to said methyl hydrogen 2,6-naphthalene dicarboxylate; and b. polyesterifying/polycondensing said esterified mixture with ethylene glycol in the presence of a polyesterification catalyst to obtain said poly(ethylene-2,6-naphthalene dicarboxylate).

2. The process of claim 1, wherein said amine catalyst is triethylamine, tripropyl amine.

3. The process of claim 1, comprising using an esterification reaction temperature of from 160° C. to 220° C.

4. The process of claim 1, comprising using a polyesterification/polycondensation reaction temperature of from 150° C. to 290° C.

5. A process for producing a poly(ethylene-2,6-naphthalene dicarboxylate) product from a mixture of dimethyl-2,6-naphthalene dicarboxylate and methyl hydrogen 2,6-naphthalene dicarboxylate, comprising:

a. reacting a mixture of dimethyl-2,6-naphthalene dicarboxylate, methyl hydrogen-2,6-naphthalene, ethylene glycol, and ethylene carboxylate in the presence of a catalytic amount of an amine or ammonium catalyst to obtain an esterified mixture, wherein said mixture of dimethyl-2,6-naphthalene dicarboxylate and methyl hydrogen 2,6-naphthalene dicarboxylate comprises at least 90 wt % of dimethyl-2,6-naphthalene dicarboxylate and not more than 10 wt % of methyl hydrogen 2,6-naphthalene dicarboxylate, and said ethylene carboxylate is present in an at least two-fold molar excess relative to said methyl hydrogen 2,6-naphthalene dicarboxylate; and b. adding a polyesterification/polycondensation catalyst to said esterified mixture and reacting same to obtain said poly(ethylene-2,6-naphthalene dicarboxylate).

6. The process of claim 5, wherein said amine catalyst is triethylamine, tripropyl amine or tributyl amine.

7. The process of claim 5, comprising using an esterification reaction temperature of from 160° C. to 220° C.

8. The process of claim 5, comprising using a polyesterification/polycondensation reaction temperature of from 150° C. to 290° C.

* * * * *